(12) United States Patent
Seder et al.

(10) Patent No.: US 8,941,690 B2
(45) Date of Patent: Jan. 27, 2015

(54) PROJECTED REAR PASSENGER ENTERTAINMENT SYSTEM

(71) Applicant: GM Global Technology Operations LLC, Detroit, MI (US)

(72) Inventors: Thomas A. Seder, Northville, MI (US); Roy J. Mathieu, Rochester Hills, MI (US); Joseph F. Szczerba, Grand Blanc, MI (US); Omer Tsimhoni, Herzliya (IL)

(73) Assignee: GM Global Technology Operations LLC, Detroit, MI (US)

( * ) Notice: Subject to any disclaimer, the term of this patent is extended or adjusted under 35 U.S.C. 154(b) by 119 days.

(21) Appl. No.: 13/693,166

(22) Filed: Dec. 4, 2012

(65) Prior Publication Data

US 2013/0147840 A1 Jun. 13, 2013

Related U.S. Application Data

(60) Provisional application No. 61/568,755, filed on Dec. 9, 2011.

(51) Int. Cl.
- *G09G 5/00* (2006.01)
- *G06T 3/00* (2006.01)
- *G02B 27/01* (2006.01)

(52) U.S. Cl.
CPC .............. *G06T 3/005* (2013.01); *G02B 27/01* (2013.01)
USPC .......................... 345/633; 340/438; 345/473

(58) Field of Classification Search
USPC ................................. 345/633, 473; 340/438
See application file for complete search history.

(56) References Cited

U.S. PATENT DOCUMENTS

| 7,756,602 | B2 * | 7/2010 | Koempel et al. | 700/213 |
|---|---|---|---|---|
| 2008/0239078 | A1 * | 10/2008 | Mohr et al. | 348/148 |
| 2010/0253593 | A1 | 10/2010 | Seder et al. | |
| 2010/0253596 | A1 | 10/2010 | Szczerba et al. | |
| 2011/0106446 | A1 * | 5/2011 | Waeller et al. | 701/209 |
| 2012/0050161 | A1 * | 3/2012 | Andersson et al. | 345/158 |
| 2012/0169754 | A1 * | 7/2012 | Pesonen et al. | 345/582 |
| 2012/0174004 | A1 | 7/2012 | Seder et al. | |

* cited by examiner

*Primary Examiner* — Maurice L McDowell, Jr.

(57) ABSTRACT

A method for augmenting a graphic displayed on a surface inside of a vehicle using a rear seat entertainment projection (RSEP) system includes generating the graphic for display on the surface inside the vehicle. When the graphic is displayed on the surface, an input that causes a reaction to the graphic displayed upon the surface is obtained, and the graphic displayed on the surface is augmented based on the reaction to the graphic.

20 Claims, 3 Drawing Sheets

PROJECTED REAR PASSENGER ENTERTAINMENT SYSTEM

CROSS REFERENCE TO RELATED APPLICATIONS

This application claims the benefit of U.S. Provisional Application No. 61/568,755, filed on Dec. 9, 2011, which is incorporated herein by reference.

TECHNICAL FIELD

This disclosure is related to projection of graphical images for passenger entertainment within a vehicle.

BACKGROUND

The statements in this section merely provide background information related to the present disclosure. Accordingly, such statements are not intended to constitute an admission of prior art.

Graphic projection systems can utilize an ultraviolet laser or other light source to project an image or graphics upon a vehicle surface. The vehicle surface can be a side window or windows, a door surface, or pillars supporting a roof of the vehicle. Projected graphics can include graphics directed toward entertaining or educating a youthful passenger. A luminescent coating can be used to display graphic projection upon a window surface. Also, a coating can be applied to the window to impart it with the function of a projection screen. Further, a transparent or emissive display can be mated with the window to enable presentation of graphics without significant loss of transparency.

It is known, to utilize wireless communications to enable a transfer of data and/or cooperation between vehicle systems and a remote device or system. A mobile computing device can be used to provide occupant inputs to a graphic projection system, controlling a resulting display content of projected graphics within the vehicle.

Vehicle systems monitor vehicle operating parameters and parameters regarding an operating environment of the vehicle. For example, vehicle speed, vehicle acceleration, vehicle rate of turn, road inclination, engine speed, transmission operating range state, hybrid operating range state, fuel flow, battery power consumption, anti-lock braking, ambient light level, ambient temperature, road condition provided through suspension and/or anti-lock braking sensors, horn-activation, presence of a passenger in a particular seat through seat belt sensors, climate control settings, geographical location of the vehicle such as a global positioning system (GPS) coordinate location, progress of the vehicle along a planned route of travel, local traffic conditions, headlight activation, and turn-signal activation are a non-inclusive list of parameters that can be available within a vehicle to convey to a passenger of the vehicle. In addition, details of objects and other vehicles around the vehicle can be monitored through camera systems, radar systems, LIDAR systems, and coordination of GPS coordinates with a three-dimensional (3D) map.

SUMMARY

A method for augmenting a graphic displayed on a surface inside of a vehicle using a rear seat entertainment projection (RSEP) system includes generating the graphic for display on the surface inside the vehicle. When the graphic is displayed on the surface, an input that causes a reaction to the graphic displayed upon the surface is obtained, and the graphic displayed on the surface is augmented based on the reaction to the graphic.

BRIEF DESCRIPTION OF THE DRAWINGS

One or more embodiments will now be described, by way of example, with reference to the accompanying drawings, in which.

DETAILED DESCRIPTION

Figure 1:
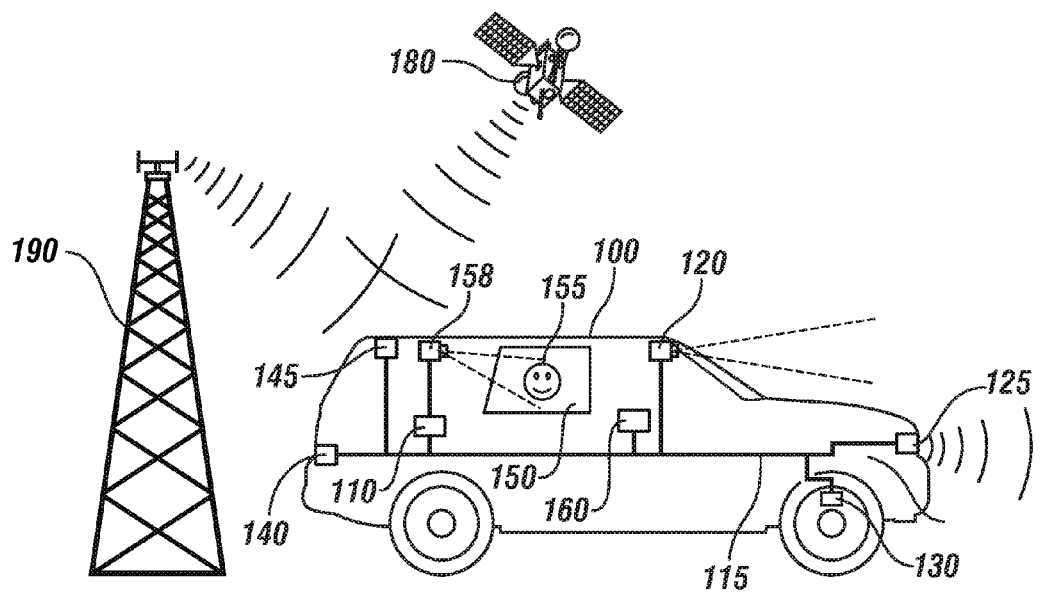
FIG. 1 illustrates an exemplary source vehicle equipped with a rear seat entertainment projection (RSEP) system manager, in accordance with the present disclosure.

Referring now to the drawings, wherein the showings are for the purpose of illustrating certain exemplary embodiments only and not for the purpose of limiting the same, FIG. 1 illustrates an exemplary source vehicle equipped with a Rear Seat Entertainment Projection (RSEP) system. An exemplary system using various vehicle inputs to project images within a vehicle is disclosed in commonly assigned and co-pending U.S. application Ser. No. 12/417,077, which is incorporated herein by reference. Exemplary source vehicle 100 includes: an RSEP system manager 110; vehicle sensor systems, including camera system 120 and radar system 125; vehicle operation sensors, including vehicle speed sensor 130; information systems, including global positioning device 140 and wireless communication system 145; side window 150; graphics projection system 158; and occupant input device 160. The RSEP system collectively includes the graphic projection system 158, RSEP system manager 110 and the occupant input device 160. The RSEP system manager 110 can communicate directly with various systems and components, or the RSEP system manager 110 can alternatively or additionally communicate over a LAN/CAN system 115. Additionally, the RSEP system manager 110 can communicate with remote systems through wireless communication system 145. While the exemplary source vehicle 100 corresponds to a passenger automobile, e.g., a car, in FIG. 1, this disclosure is equally applicable to vehicles such as, but not limited to, boats, aircraft, all-terrain vehicles and trucks.

Details of an operating environment of the source vehicle can be monitored by a number of devices and/or systems. Camera system 120 includes a camera or image capturing device taking periodic or sequential images representing a view from the source vehicle. Additionally, the camera system 120 can capture continuous video images representing the view from the source vehicle. Radar system 125 includes a device known in the art utilizing electromagnetic radiation to detect other vehicles or objects located near the source vehicle. A number of known in-vehicle sensors are used within a vehicle to monitor vehicle speed, engine speed, wheel slip, and other parameters representative of the operation of the source vehicle. Vehicle speed sensor 130 represents one such in-vehicle sensor, but the scope of the disclosure includes any such sensors for use by the RSEP system. Global positioning device 140 and wireless communication system 145 communicate with resources outside of the source vehicle, for example, satellite system 180 and cellular communications tower 190. Global positioning device 140 may be utilized in conjunction with a 3D map database including detailed information relating to a global coordinate received by the global positioning device 140 regarding the current location of the source vehicle. Additionally, vehicle-to-vehicle or vehicle-to-infrastructure communications can be utilized to obtain information. For example, vehicles can network to provide each other with detailed location information of each vehicle and collectively describe road geometry. Further, infrastructure devices can transmit a localizing signal, permitting the source vehicle to be located and oriented to a coordinate system with improved accuracy. Similarly, infrastructure devices can monitor traffic, road conditions, weather, or other pertinent information and transmit the information to proximately located vehicles. Information from the vehicle sensor systems and the vehicle operation sensors can be utilized by the RSEP system manager 110 to monitor the current orientation of the source vehicle. Orientation can include a number of parameters known in the art detailing how the source vehicle is configured upon the roadway and a condition of the vehicle. Exemplary parameters include pitch, roll, yaw, heave, and warp. Information regarding the vehicle and the operating environment of the vehicle can be monitored directly by RSEP system manager 110.

Side window 150 can be treated or configured with luminescent or reflective coating to enable projection of graphical images clearly upon the window. Additionally or alternatively, graphics can be projected upon interior surfaces of the vehicle within the back seat environment, for example, including door surfaces, pillars, and seat backs of a forward row of seats, a headlinder, a sunroof, a floor, a substantially transparent display and an emissive display. Side window 150 is illustrated proximate to a second row of seats in the vehicle for the entertainment of a passenger in the second row. The second row is located behind a first row (e.g., front row) of seats which include the seating area for the operator of the vehicle. In another embodiment, side window 150 can be located proximate to a third or later row of seats, depending upon the configuration of the vehicle. In one embodiment, RESP system manager 110 can be configured to control displays upon multiple surfaces in the vehicle. Such a multiple surface display can include all similar graphical content, or different content can be selected for different displays, for example, based upon the age or specific interests of the passenger viewing the particular display.

RSEP system manager 110 includes a processing device that includes display software or programming for displaying graphical representations for display by graphics projection system 158. The RSEP system manager 110 included programming compensates for the curved and tilted surfaces of the side window and any other surfaces onto which graphics are to be projected. These compensations permit a graphic to be shifted across a surface or across multiple surfaces while maintaining a consistent appearance of the graphic being displayed from the perspective of a passenger viewer. An exemplary system for displaying images across a plurality of non-flat surfaces within a vehicle is disclosed in commonly assigned and co-pending U.S. application Ser. No. 12/563, 407, which is incorporated herein by reference. The RSEP system manager 110 additionally controls graphics projection system 158 including a laser or projector device producing an excitation light to project the graphical representations. FIG. 1 illustrates an exemplary graphic 155 upon side window 150 projected by the graphics projection system 158.

The occupant input device 160 can receive inputs from an occupant that are input to the RSEP system manager 110 to generate and further augment the graphics displayed on the surface inside of the vehicle. For instance, an input from the occupant can be directed to turn a graphic on or off. Likewise, the occupant can retrieve a desired graphic for display. In another example, the occupant can interact with the graphic to cause a reaction to the graphic. The occupant input device 160 can include a number of different embodiments. In one embodiment, the occupant input device 160 can include a mobile computing device such as a mobile phone or a tablet device configured to communicate wirelessly with the RSEP system manager 110 or through an infrared signal with the RSEP system manager 110. In other embodiments, the occupant input device 160 can include dedicated hardware within the vehicle including a keypad, touch screen device, joystick, or any other manual input device known in the art. In yet another embodiment, the occupant input device 160 can include an imaging device generating 3D mapping of hand movement of the occupant. An exemplary system for generating 3D mapping of hand movements of a passenger within a vehicle is disclosed in commonly assigned and co-pending U.S. application Ser. No. 12/982,478, which is incorporated herein by reference. A number of exemplary systems or devices are envisioned for receiving occupant inputs, and the disclosure is not intended to be limited to the particular exemplary embodiment provided herein. In addition, an auxiliary or secondary input device can be provided, for example, permitting an occupant in the front row of seats to provide inputs to the system to control graphics displayed for a young child. In an embodiment wherein an imaging system is utilized to determine hand movements of a passenger, such an image can additionally be used to permit a parent in the front seat of the vehicle to view an image of a child in the back seat of the vehicle. The system can monitor inactivity of the passenger, and the system can time out the graphic based upon inactivity of the passenger indicating that the passenger is likely asleep.

Figure 2:
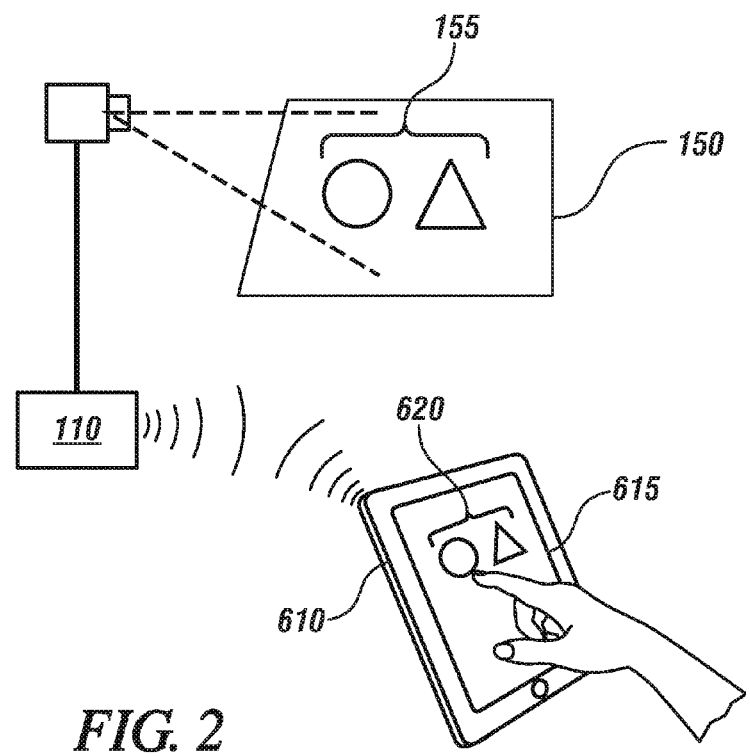
FIG. 2 illustrates an exemplary configuration of the RSEP system manager of FIG. 1 communicating with an input device to permit generation and augmentation of graphics upon a side window inside the vehicle, in accordance with the present disclosure.

FIG. 2 illustrates an exemplary configuration of the RSEP system manager 110 communicating with an occupant input device 610 to permit generation and augmentation of graphics upon a surface inside the vehicle, e.g., a side window, in accordance with the present disclosure. Side window 150, graphics projection system 158, RSEP system manager 110, and an occupant input device 610, e.g., a mobile computing device including a tablet device, are illustrated. The occupant input device 610 including a tablet device is illustrated communicating wirelessly with RSEP system manager 110. Additionally or alternatively, tablet device 610 and RSEP system manager 110 can include a wire connection to the RSEP system manager 100, an infrared connection to the RSEP system manager 110, a connection to another device in the vehicle or to a remote system outside the vehicle that connects with the RSEP system manager 110, or any other method accomplishing data transfer between the RSEP system manager 110 and the tablet device 610. A plurality of exemplary choices can be presented to the passenger, for example, as provided by software in the tablet device 610, in the RSEP system manager 100, or by a remote system outside the vehicle, and these choices can be presented upon an interior surface, e.g., the side window 150, as graphics 155, upon a graphical user interface (GUI) 615 of the tablet device 610 as graphics 620, or both. The GUI 615 of the tablet device 610 can include input objects, physical buttons, speech inputs, or any other method of input known in the art. The tablet device 610 is provided as an exemplary occupant input device, however a number of devices including mobile phones, handheld personal digital assistant (PDA) devices, MP3 players, gaming devices, or other dedicated vehicle hardware devices are envisioned. The disclosure is not intended to be limited to the particular exemplary embodiments provided herein.

The RSEP system manager 110 and other devices or systems in the source vehicle can use or be a part of a control module within the source vehicle. Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 3:
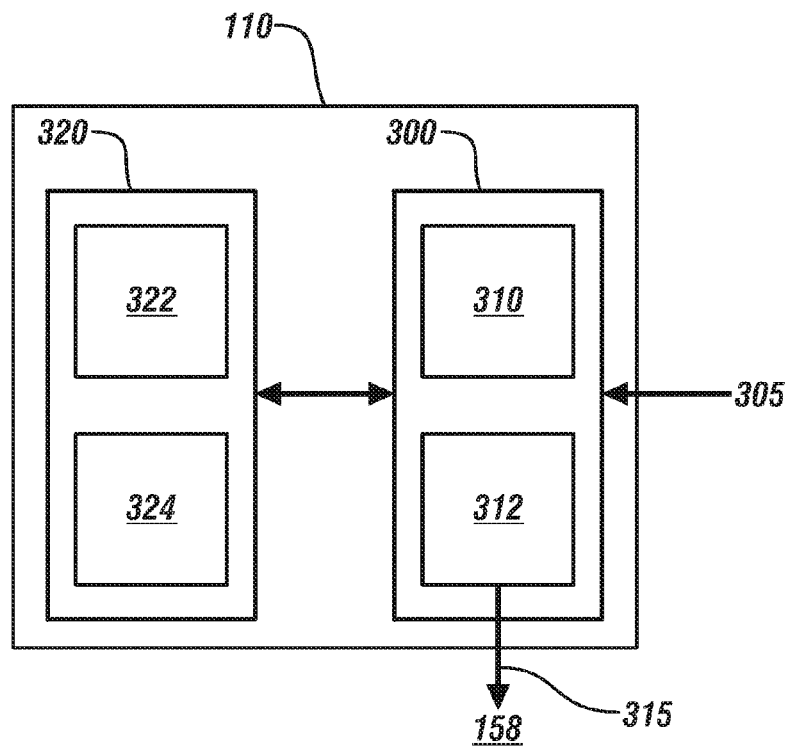
FIG. 3 illustrates a RSEP system manager of FIG. 1, in accordance with the present disclosure.

FIG. 3 illustrates the RSEP system manager 110 of FIG. 1, in accordance with the present disclosure. The RSEP system manager 110 includes a processing device 300 and a graphic database module 320. The processing device 300 includes a graphic generation module 310 and a graphic augmenting module 312.

The graphic generation module 310 generates a graphic for display on a surface inside of the vehicle. The surface inside the vehicle is selected from the group including, for example, a side window, a door surface, a pillar, a seat back of a forward seat a headliner, a sunroof, a floor, a substantially transparent display, or an emissive display. The surface can be treated with luminescent or reflective coating to enable projection of the graphic clearly upon the surface. The graphic generation module 310 can receive an input 305 for requesting the graphic for display on the surface. For instance, the input 305 requesting the graphic can correspond to an occupant input to the occupant input device 160 selecting a desired graphic and the graphic generation module 310 may query the graphic database module 320 to retrieve the graphic. The graphic database module 310 can include one or more databases for storing graphics. As illustrated in FIG. 3, the graphic database module 310 stores graphics being indicative of entertainment content stored in an entertainment database 322 and animation content stored in an animation database 324. In one example, the occupant may use a mobile computing device such as a tablet device to perform a keyword search to select a desired graphic, wherein the graphic can be obtained wirelessly over a network and subsequently stored in the graphic database module 320. The graphic may be additionally displayed upon the tablet device or other occupant input device. Accordingly, the occupant input device including the tablet device may select the desired graphic and subsequently store the graphic within one of the entertainment and animation databases 322, 324, respectively. The entertainment database 322 may store media content obtained from on-board storage devices, media devices broadcasting audio and video content, on-line services, or other systems pertaining to media content. Accordingly, graphics can be indicative of the media content. Similarly, media content can include information relating to sporting events where graphics indicative of sporting event scores, summaries, and other information can be displayed on the surface inside the vehicle. In another embodiment, the entertainment database 322 may store photos obtained from on-line services, remote storage devices, the occupant input device, or other systems capable of storing photos. The animation database 324 may store animated graphics such as virtual animals, virtual flowers and virtual toys to entertain an occupant of a certain age range and/or interests.

The processing device 300 of the RSEP system manager 110 transmits display requirements 315 to the graphic projection system 158 for displaying a generated graphic and augmenting an already displayed graphic.

Once a graphic is displayed upon the surface inside the vehicle, the graphic augmentation module 312 of the processing device 300 may obtain an input that causes a reaction to the graphic displayed upon the surface. In one embodiment, the input 305 can include an occupant input to the occupant input device 160 intended to interact with the graphic. The graphic augmentation module 312 can thereby determine whether or not the occupant input is interacting with the graphic to cause the reaction to the graphic. For example, the occupant can interact with or be prompted to interact with an animation such as a virtual animal displayed upon the surface inside the vehicle. The graphic (e.g., virtual animal) may react to a monitored hand location of the occupant indicating a reaching out to the virtual animal. In such an instance, the virtual animal can be made to react in a predictable manner. The occupant can select from available interactive options, for example, using an input to feed or groom the illustrated animal, with the illustrated graphic responding appropriately.

In another embodiment, the input 305 can include monitoring parameters related to an operating environment of the vehicle obtained from at least one of in-vehicle sensors and resources outside the vehicle. The graphic augmentation module 312 can thereby determine a virtual effect upon the graphic using the parameters related to the operating environment of the vehicle. The parameters related to the operating environment of the vehicle may include ambient conditions proximate to the vehicle selected from the group including, for example, a current location of the vehicle, road geometry, traffic conditions, road conditions and weather. In a non-limiting example, when the displayed graphic includes the virtual animal, the virtual animal may have an umbrella over its body if it raining out or may wear sunglasses and a bathing suit if it is hot and sunny outside. In another non-limiting example, the camera system 120 could capture a train crossing at a distance ahead of the vehicle. Here the virtual animal may be animated to signify the virtual animal's movement coming to a halt in anticipation of the source vehicle stopping for the crossing train.

In another embodiment, the input 305 can include monitoring media content obtained from at least one of media devices located within the vehicle and resources outside the vehicle. The graphic augmentation module 312 can thereby determine a virtual effect upon the graphic using the media content. In a non-limiting example, when the displayed graphic includes the virtual animal, the virtual animal may dance to the beat of music being broadcasted through the audio system of the vehicle. In another embodiment, lyrics to a song being broadcasted through the audio system may graphically stream or scroll upon the surface inside the vehicle.

Embodiments are not restricted from the input 305 being obtained from a non-onboard source such as a non-occupant communicating with the occupant through any communication. For instance, a message from the non-occupant may be sent to the occupant input device that includes a mobile computing device. The message can be perceived as the input 305 and may be graphically displayed upon the surface or may augment a graphic already displayed upon the surface. In another instance, vehicle to vehicle communications between the source vehicle and another vehicle can include obtaining the input 305 from the other vehicle.

In another embodiment, the input 305 can include the vehicle information obtained from at least one in-vehicle sensor. The vehicle information may include vehicle operating parameters selected from the group including, for example, vehicle speed, vehicle braking, vehicle acceleration, engine speed, wheel slip, vehicle orientation parameters and vehicle health parameters. The graphic augmentation module 312 can thereby determine a virtual effect upon the graphic using the monitored vehicle information. For example, the virtual animal can be displayed upon the inside surface including the side window 150 and augmented based upon motion or other parameters of the vehicle such as a magnitude of the vehicle speed. For instance, the virtual animal can be augmented to run along-side the vehicle, with the graphic being appropriate for the speed of the vehicle. In other words, the animated graphic (e.g., virtual animal) can run or walk depending on the vehicle speed. When the vehicle comes to a stop, the virtual animal can also stop. The animal can ignore actual features in the operating environment visible through the side window 150. In another embodiment, wherein locations of other vehicles, traffic signs, and other features are known, the animal can be illustrated to interact with these features, jumping over cars or landing upon a signpost. In addition to vehicle speed, other vehicle parameters such as turning, braking and acceleration of the vehicle moving can be used to augmented the animated graphic, for example, with the virtual animal turning with the vehicle or skidding to a stop. The animated animal can react randomly between a plurality of responses to a given behavior in the vehicle. The animated animal can include slap-stick animations, for example, with the animal tripping and tumbling to a stop with the vehicle. A plurality of animals can be animated simultaneously, for example, with a greyhound and a cheetah racing, with the cheetah winning in the short run, but with the greyhound having greater endurance than the cheetah. The plurality of animated animals can interact with each other, for example, with two tiger cubs playing with each other, e.g. playing hide and seek, when the vehicle stops. The animal or animals can react differently or be illustrated with different items depending upon the area the vehicle is traveling in, for example, with a virtual surfboard near the ocean or with semi-stationary cows being situated in the environment of the animal when the vehicle is in a rural area. The animal or animals can react when in a certain way when the vehicle reaches the end of a planned route of travel.

In another non-limiting example, the displayed graphic can include a virtual flower, e.g., a daisy, which can be animated to experience an effect of virtual wind based upon a speed of the vehicle. For instance, at a stop, the flower stands still or slightly wafts. At slow speeds, the shaft of the flower can bend backward and the flower petals can vibrate softly. As the speed of the vehicle increases, the illustrated shaft can bend to a greater degree and the illustrated flower petals can begin to blow off. The petals can blow off the end of the display and disappear, or the flower petals can collect at the back of the display. When the vehicle stops, the flower petals can come to a rest at the bottom of the display, become restored to the flower, or fly around the display in a colorful pattern. Reactions of the flower petals to different inputs can be randomized between a number of possible reactions. Instead of flower petals, a dandelion with a plurality of white, fluffy seeds can be animated and dispersed based upon the speed of the vehicle. A plurality of flowers can be displayed. A butterfly, a bee, or raindrops can be illustrated to react with the flowers. A small stream can be displayed to flow beneath the flower. The passenger can select the type of flower displayed and interact with the flower or other graphics. The flower petals can have different shades or colors for the top and bottom of the petals. Flower petals can be animated to react differently to the virtual wind based upon the size and geometry of the flower petals, separating from the flower differently and traveling to the back of the display at different speeds and with a different trajectory. Behavior of the flower and the petals can be randomized so that the experience of the passenger is different for each iteration of the program.

In yet another non-limiting example, the displayed graphic can include a small ball that is reacted by motion of the vehicle. The ball can be located upon a geometric feature or features, e.g., an include, and a model of how the ball would react to wind, acceleration of the vehicle, bumps in the road, being sheltered from the wind by some structure, or interaction with graphical features such as springs, trampolines, or loops can be used to animate movement of the ball. The occupant can configure the environment of the ball and watch how the ball would react to different inputs. The occupant can change parameters of the virtual environment such as the viscosity of the virtual air, the effect of virtual gravity, the number of balls depicted, and properties of the ball such as size, shape, and bounciness. More complicated features can be configured, such as a virtual spring device that only compresses when the vehicle turns or comes to a complete stop that the ball can come into contact with. A number of virtual geometric features can be aligned upon the display, creating a Rube Goldberg machine for the ball or balls to roll through as the vehicle parameters change. An air flow pattern including virtual flow lines can be toggled on and off, such that the occupant can observe how the virtual air is flowing around the ball and included features. The air can include a viscous and/or a turbulent flow with a boundary between the flows based upon speed of the vehicle.

It will be understood that a number of graphics can be projected upon a display based upon motion and other parameters of the vehicle, and operating environment surrounding the vehicle and media content are envisioned, and the disclosure is not intended to be limited to the particular exemplary embodiments provided herein. Alternatively or additionally, graphics can be displayed on other surfaces in the vehicle, for example, with a virtual parrot landing when the vehicle stops on the pillar between the first and second rows or with an illustrated wrecking ball illustrated on a seat back, swinging back and forth each time the car turns to iteratively damage and eventually knock down an illustrated configurable structure, with optional inputs from the occupant such as the length of the rope holding the ball or the shape of the ball.

Figure 4:
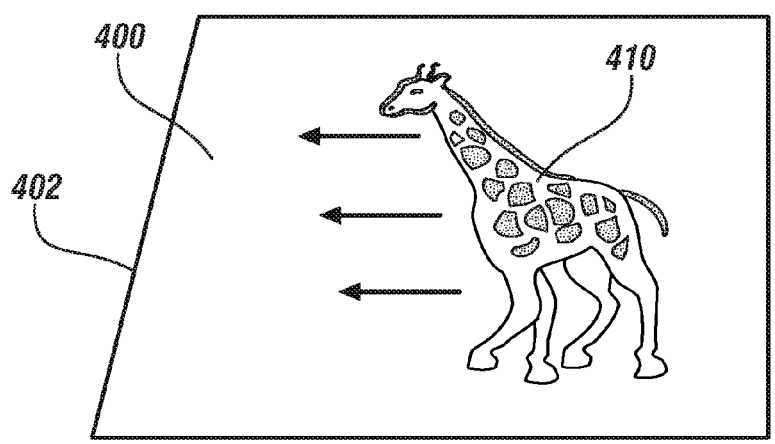
FIGS. 4-6 illustrate exemplary graphics that can be projected upon a on the interior of the vehicle, in accordance with the present disclosure.
Figure 5:
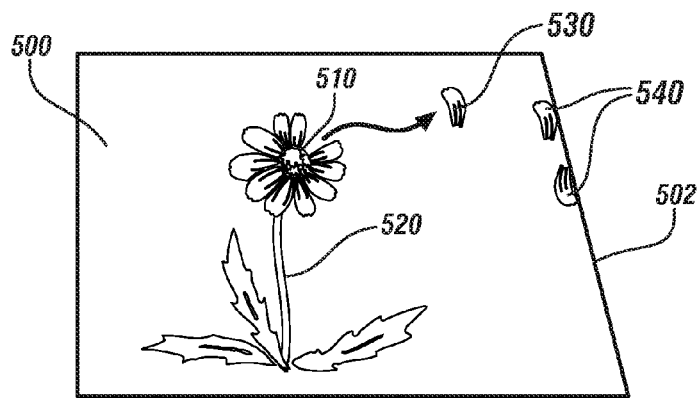
Figure 6:
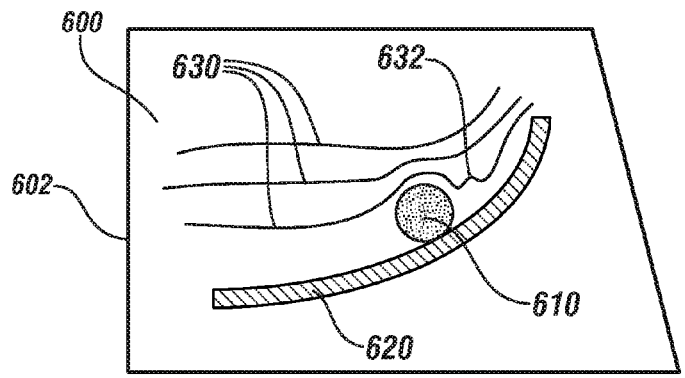

FIGS. 4-6 illustrate exemplary graphics that can be projected upon a surface on the interior of the vehicle, e.g., a side window display. FIG. 4 includes side window display 400 including a forward edge 402 corresponding to the forward direction in which the vehicle is travelling. A virtual giraffe 210 is animated running in the same direction as the vehicle. FIG. 5 includes side window display 500 including a trailing edge of the display 502 corresponding to a rearward direction for the vehicle. Virtual flower 510 is animated including stem 520 bending toward the trailing edge of the display 502 as if wind were blowing the flower. A blown off petal 530 is animated in flight blowing away from flower 510, and blown off petals 540 are animated against the trailing edge of the display 502 as if the wind is holding them against the edge. FIG. 4 includes side window display 600 including a forward edge 602 corresponding to the forward direction in which the vehicle is traveling. Virtual ball 610 is animated upon a ramp feature 620. Ball 610 is animated some way up the ramp feature 620 based upon a modeled effect of wind based upon the motion of the vehicle counteracting gravity pulling the ball down ramp feature 420. Virtual flow lines 630 for the air flowing over the ball 610 are animated including a region of turbulence 632 behind the ball 410.

Figure 7:
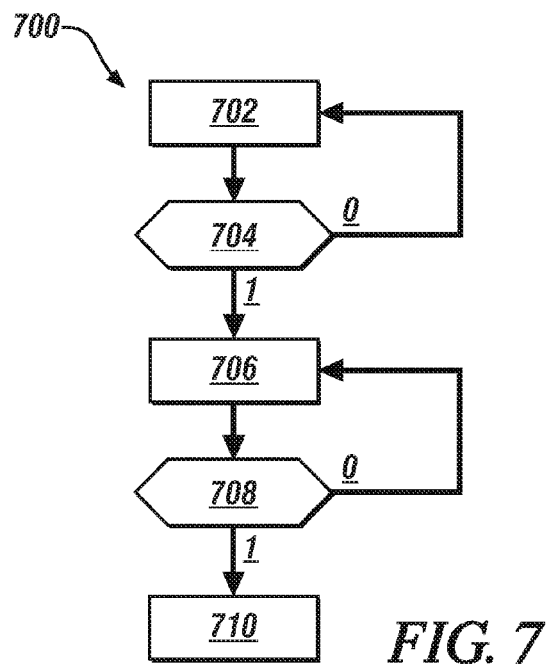
FIG. 7 illustrates an exemplary flowchart to augment a graphic displayed on a surface inside of a vehicle based on a reaction to the graphic, in accordance with the present disclosure.

FIG. 7 illustrates an exemplary flowchart 700 to augment a graphic displayed on a surface inside of a vehicle based on a reaction to the graphic. Table 1 is provided as a key to FIG. 7 wherein the numerically labeled blocks and the corresponding functions are set forth as follows.

TABLE 1

| BLOCK | BLOCK CONTENTS |
|---|---|
| 702 | Generate a graphic for display on the surface inside the vehicle. |
| 704 | Is the graphic displayed? |
| 706 | Obtain an input. |
| 708 | Does the obtained input cause a reaction to the graphic displayed on the surface? |
| 710 | Augment the graphic displayed on the surface based on the reaction to the graphic. |

Referring to block 702, a graphic is generated for display on the surface inside the vehicle. Specifically, the graphic generation module 310 generates the graphic for display on the surface by receiving an occupant input requesting the graphic for display on the surface and retrieving the graphic from the graphic database module 320 using the occupant input. The graphic may be first generated at an occupant input device, such as a mobile computing device, using the occupant input, wherein the graphic is subsequently stored within the graphic database module 320 for retrieval by the graphic generation module 310. The graphic projection system 158 receives display requirements 315 from the notification generation 310 to thereby display the graphic upon the surface. The surface inside the vehicle can include at least one of a side window, a door surface, a pillar and a seat back of a forward seat a headlinder, a sunroof, a floor, a substantially transparent display and an emissive display.

Decision block 704 determines if the graphic is displayed. A "0" denotes that the graphic is not displayed or an occupant has selected to no longer display the graphic, and the flow chart reverts back to block 702. A "1" denotes that the graphic is displayed on the surface, and the flowchart proceeds to block 706.

Block 706 obtains an input. Specifically, the graphic augmentation module 312 monitors the input 305 that can include any one or more of the monitored operator input, the monitored vehicle information, the monitored media content and the monitored parameters related to the operating environment of the vehicle, as aforementioned.

Decision block 708 determines if the obtained input causes a reaction to the graphic displayed on the surface. In one embodiment, the graphic augmentation module 312 can determine an occupant input is interacting with the graphic to cause the reaction to the graphic. In another embodiment, the graphic augmentation module 312 can determine a virtual effect upon the graphic using monitored vehicle information. Similarly, the graphic augmentation module 312 can determine a virtual effect upon the graphic using parameters related to the operating environment and/or media content. A "0" denotes that the obtained input does not cause a reaction to the graphic, and the flowchart 700 reverts back to block 706. A "1" denotes that the obtained input does cause a reaction to the graphic, and the flowchart 700 proceeds to block 708.

Block 710 augments the graphic displayed on the surface based on the reaction to the graphic. Specifically, the graphic projection system 158 displays the augmented graphic onto the surface inside the vehicle based on the display requirements 315 transmitted from the graphic augmentation module 315.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for augmenting a graphic displayed on a surface inside of a vehicle using a rear seat entertainment projection (RSEP) system, comprising:
generating, at a processing device of the RSEP system, the graphic for display on the surface inside the vehicle;
when the graphic is displayed on the surface:
obtaining, at the processing device, an input that causes a reaction by the graphic displayed on the surface; and
augmenting the graphic displayed on the surface based on the reaction by the graphic.

2. The method of claim 1, wherein generating the graphic for display on the surface inside the vehicle comprises:
receiving, at the processing device, an occupant input requesting the graphic for display on the surface; and
retrieving, at the processing device, the graphic from a graphic database using the occupant input, the graphic database storing graphics being indicative of entertainment content and animation content.

3. The method of claim 2, wherein retrieving the graphic from the graphic database using the occupant input comprises:
selecting, at an occupant input device, the graphic for display on the surface using the occupant input to the occupant input device; and
storing the graphic within the graphic database.

4. The method of claim 1, wherein obtaining the input that causes the reaction by the graphic displayed on the surface comprises:
monitoring, at the processing device, an occupant input to an occupant input device intended to interact with the graphic; and
determining, at the processing device, the occupant input is interacting with the graphic to cause the reaction by the graphic.

5. The method of claim 1, wherein obtaining the input that causes the reaction by the graphic displayed on the surface comprises:
monitoring, at the processing device, vehicle information obtained from at least one in-vehicle sensor; and determining, at the processing device, a virtual effect upon the graphic using the monitored vehicle information.

6. The method of claim 5 wherein the vehicle information includes vehicle operating parameters selected from the group consisting of: vehicle speed, vehicle braking, vehicle acceleration, engine speed, wheel slip, vehicle orientation parameters and vehicle health parameters.

7. The method of claim 1, wherein obtaining the input that causes the reaction by the graphic displayed on the surface comprises:
monitoring, at the processing device, parameters related to an operating environment of the vehicle obtained from at least one of in-vehicle sensors and resources outside the vehicle; and
determining, at the processing device, a virtual effect upon the graphic using the parameters related to the operating environment of the vehicle.

8. The method of claim 7, wherein the parameters related to the operating environment of the vehicle include ambient conditions proximate to the vehicle selected from the group consisting of: a current location of the vehicle, road geometry, traffic conditions, road conditions and weather.

9. The method of claim 1, wherein obtaining the input that causes the reaction by the graphic displayed upon the surface comprises:
monitoring, at the processing device, media content obtained from at least one of media devices located within the vehicle and resources outside of the vehicle;
determining, at the processing device, a virtual effect upon the graphic using the media content.

10. The method of claim 1 wherein the surface inside the vehicle is treated with luminescent or reflective coating to enable projection of graphical images clearly upon the surface, the surface selected from the group consisting of: a side window, a door surface, a pillar, a seat back, a headliner, a sunroof, a floor, a substantially transparent display and an emissive display.

11. The method of claim 1, further comprising:
displaying the generated graphic and the augmented graphic onto an occupant input device.

12. Apparatus for augmenting a graphic displayed on a surface inside of a vehicle using a rear seat entertainment projection (RSEP) system manager, comprising:
a graphic generation module for generating the graphic for display on the surface;
a graphic augmentation module for obtaining an input that causes a reaction by the graphic displayed upon the surface and augments the graphic based on the reaction by the graphic; and
a graphic projection system for displaying the generated graphic and the augmented graphic on the surface inside the vehicle, the surface inside the vehicle including at least one of a side window, a door surface, a pillar, a seat back, a headliner, a sunroof, a floor, a substantially transparent display and an emissive display.

13. The apparatus of claim 12, wherein the graphic generation module generates the graphic for display on the surface by receiving an occupant input requesting the graphic for display on the surface and retrieving the graphic from a graphic database using the occupant input, the graphic database storing graphics being indicative of entertainment content and animation content.

14. The apparatus of claim 13, wherein the graphic generation module retrieves the graphic from the graphic database when the graphic is first generated at an occupant input device using the occupant input and subsequently stored within the graphic database.

15. The apparatus of claim 13, wherein the graphic augmentation module obtains the input that causes the reaction by the graphic by monitoring an occupant input to an occupant input device intended to interact with the graphic and determining that the occupant input is interacting with the graphic to cause the reaction by the graphic.

16. The apparatus of claim 15, wherein the graphic is prompting a response from the occupant.

17. The apparatus of claim 15, wherein the occupant input device is selected from the group consisting of: a mobile computing device, a keypad, a touch screen device, a joystick and an imaging device generating 3D mapping of hand movement of the occupant.

18. The apparatus of claim 12, wherein the graphic augmentation module obtains the input that causes the reaction by the graphic by monitoring vehicle information obtained from at least one in-vehicle sensor, the monitored vehicle information creating a virtual effect upon the graphic.

19. The apparatus of claim 12, wherein the graphic augmentation module obtains the input that causes the reaction by the graphic by monitoring ambient conditions proximate to the vehicle obtained from at least one of in-vehicle sensors and resources outside of the vehicle, the monitored ambient conditions creating a virtual effect upon the graphic.

20. The apparatus of claim 12, wherein the graphic augmentation module obtains the input that causes the reaction by the graphic by monitoring media content obtained from at least one of media devices located within the vehicle and resources outside of the vehicle, the monitored media content creating a virtual effect upon the graphic.

* * * * *